United States Patent
Kobler et al.

(10) Patent No.: US 9,227,269 B2
(45) Date of Patent: Jan. 5, 2016

(54) METHOD FOR PRODUCING AN ENERGY CELL AND APPARATUS FOR CARRYING OUT SAME

(71) Applicant: Robert Bosch GmbH, Stuttgart (DE)

(72) Inventors: Christof Kobler, Stuttgart (DE); Reiner Ramsayer, Rutesheim (DE); Andreas Netz, Ludwigsburg (DE); Jens Koenig, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 13/894,148

(22) Filed: May 14, 2013

(65) Prior Publication Data
US 2013/0298387 A1    Nov. 14, 2013

(30) Foreign Application Priority Data

May 14, 2012  (DE) .......................... 10 2012 208 010

(51) Int. Cl.
| | |
|---|---|
| H01M 4/13 | (2010.01) |
| B23K 26/38 | (2014.01) |
| H01M 10/04 | (2006.01) |
| B23K 26/14 | (2014.01) |
| B23K 26/40 | (2014.01) |
| H01M 10/052 | (2010.01) |

(52) U.S. Cl.
CPC .............. B23K 26/38 (2013.01); B23K 26/1417 (2013.01); B23K 26/409 (2013.01); H01M 10/04 (2013.01); H01M 10/0413 (2013.01); H01M 10/0436 (2013.01); H01M 10/052 (2013.01); *Y10T 29/49108* (2015.01); *Y10T 29/53135* (2015.01)

(58) Field of Classification Search
CPC .. B23K 26/1417; B23K 26/38; B23K 26/409; H01M 10/04; H01M 10/0413; H01M 10/0436; H01M 10/052; H01M 4/13; H01M 10/0404
USPC ............. 429/141, 144, 149, 152, 209, 231.95
See application file for complete search history.

(56) References Cited

U.S. PATENT DOCUMENTS

| | | | |
|---|---|---|---|
| 5,713,128 A | 2/1998 | Schrenk et al. | |
| 2004/0018428 A1* | 1/2004 | Cochran et al. | 429/217 |
| 2004/0259326 A1* | 12/2004 | Hideo | 438/458 |
| 2010/0028767 A1* | 2/2010 | Inose et al. | 429/128 |

FOREIGN PATENT DOCUMENTS

DE    19705033    8/1997

OTHER PUBLICATIONS

Patwa et al., "High Speed Laser Cutting of Electrodes for Advanced Batteries," ICALEO, Sep. 26-30, 2010, 8 pages.
Application Note No. 102, Cutting of Thin Wafers with SYNOVA Laser-Microjet®, retrieved on Feb. 28, 2015 from the Internet at http://www.synova.ch/semiconductors/thin-wafers/, 3 pages.

* cited by examiner

*Primary Examiner* — Patrick Ryan
*Assistant Examiner* — Ben Lewis
(74) *Attorney, Agent, or Firm* — Michael Best & Friedrich LLP

(57) ABSTRACT

A method for producing an energy cell, in particular an energy storage cell or battery, having the steps of: arranging a plurality of films of the energy cell at a processing location, and cutting the plurality of films in one operation, wherein the cutting of the films is carried out by a laser beam, and wherein the laser beam is guided in a liquid. Also an apparatus for producing an energy cell.

9 Claims, 1 Drawing Sheet

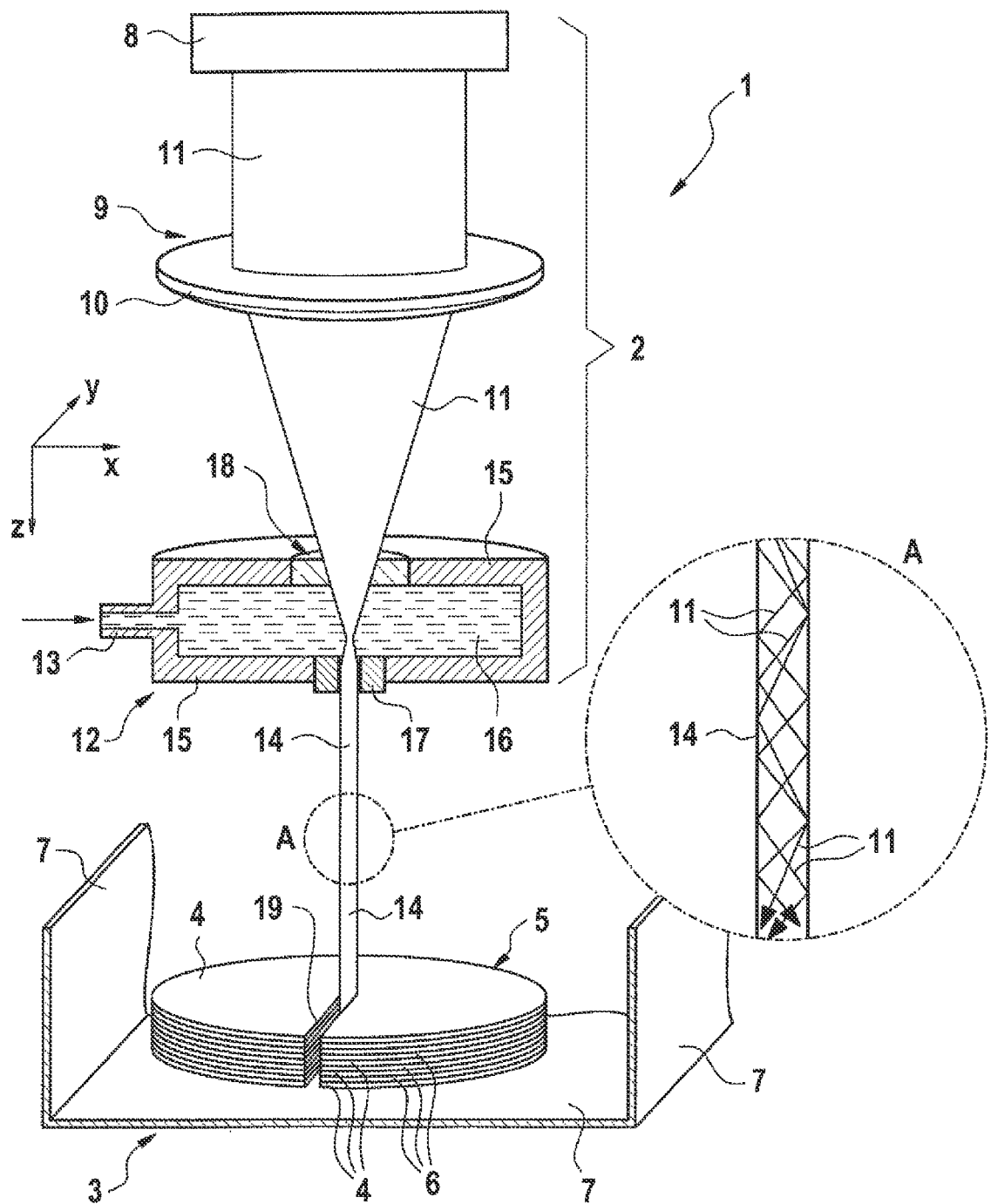

METHOD FOR PRODUCING AN ENERGY CELL AND APPARATUS FOR CARRYING OUT SAME

BACKGROUND OF THE INVENTION

The invention relates to a method for producing an energy cell, in particular an energy storage cell, such as a battery, and to an apparatus for carrying out this method. The invention is used in particular in the production of lithium-ion batteries.

The procedure known hitherto from the technical literature for the production of battery films for constructing batteries, in particular lithium-ion batteries, is the mechanical cutting or punching of the films, as is described for example in the patent DE 197 050 33 A1. Recently, the cutting of the battery films by means of brilliant laser beam sources, in particular fiber lasers, has also been studied and published (e.g. "High Speed Laser Cutting of Electrodes for Advanced Batteries", ICALEO, 26-30 Sep. 2010, Herfurth, Hans; Heinemann, Stefan).

Plant engineering for water-jet-guided laser cutting is likewise known and commercially available (e.g. MicroJet laser from Synova).

SUMMARY OF THE INVENTION

Provided according to the invention is a method for producing an energy cell, and an apparatus for producing an energy cell.

Accordingly, there is provided: a method for producing an energy cell, having the steps of: arranging a plurality of films of an energy cell at a processing location, and cutting the plurality of films in one operation, wherein the cutting of the films is carried out by a laser beam, and wherein the laser beam is guided in a liquid.

Also provided is: an apparatus for producing an energy cell, having: a processing location for arranging a plurality of films of the energy cell one on top of another in a stack, and a cutting head, which is arranged above or next to the processing location, for cutting the plurality of films in one operation, wherein the cutting head has a laser source and a nozzle for generating a liquid jet directed onto the processing location, wherein the cutting head is designed to guide a laser beam of the laser source into the liquid jet.

In a preferred embodiment of the invention, the liquid is directed toward the films in a jet which cools a cut edge of the films during cutting. Preferably, the laser beam is guided onto the films at the processing location in a liquid jet. In this case, the laser beam can be guided into the liquid jet through a nozzle, for example by means of an arrangement which comprises a lens and/or a waveguide, for example glass fibers. Preferably, the liquid jet forms a kind of waveguide which guides the laser beam by internal reflection.

The present invention has the advantage that films, especially the cut edges of the films, are not substantially soiled or damaged by the production method according to the invention, as may otherwise be the case in other production or manufacturing methods. With the production method according to the invention, no chips or splinters are left behind and no flaking of a coating on the films is created at the cut edges, which flaking could lead, when the films are used in a battery, to a short circuit between the films and thus to failure of the battery. This is because the jet of liquid serves both to cool the edges of the film during cutting by way of the laser beam and also to simultaneously remove possible melt drops, chips or splinters and/or removed materials, when and where the cutting is currently taking place.

In a preferred embodiment of the invention, the laser source can comprise a DPSS (Diode Pumped Solid State) laser, a pulsed laser and/or a fiber laser. Other suitable types of lasers are also known to a person skilled in the art. Various laser beams are suitable for use in the production of batteries. The laser beam could for example a power in the range of about 5 to 50 watts or in the range of about 100 to 1000 watts, depending on the material and thickness of the electrode films. The dot size of the laser beam is preferably in the range of about 5 µm to 100 µm, more preferably in the range of about 10 µm to 20 µm.

In a preferred embodiment of the invention, the plurality of films are arranged one above or on top of another in a stack at the processing location. The individual films are preferably kept separate or isolated from one another in the stack by respective separating layers or separators. Preferably, the stack of films at the processing location has a substantially prismatic shape, for example a rectangular prismatic shape. In this connection, the processing location is preferably designed for stacking the films in a substantially prismatic shape beneath the cutting head of the apparatus according to the invention.

In a preferred embodiment of the invention, the energy cell is an energy storage cell or a battery or rechargeable battery, in particular a lithium-ion battery, and the films are battery films or electrode films. Typically, these films each have a thickness in the range of about 10 µm to 200 µm, preferably in the range of about 10 µm to 100 µm. For example, the anode films in current lithium-ion batteries have a core composite composed of a copper layer or film between two graphite layers, while the cathode films have a core composite composed of an aluminum layer or film between two layers of metal oxides, for example $LiC_oO_2$, $LiMn_2O_4$, $LiFeP_{o4}$, graphite (up to about 5%) and binding material. In this case, the individual anode films have a thickness in the range of about 50 µm to 150 µm, preferably in the range of about 80 µm to 100 µm, and the individual cathode films have a thickness in the range of about 100 µm to 300 µm, preferably in the range of about 150 µm to 200 µm. A stack of the plurality of films for a battery can therefore have a thickness in the range of about 1 mm to 50 mm, preferably in the range of about 1 mm to 10 mm. In this case, the liquid for guiding the laser beam may be a solvent or else an electrolyte of the battery. It is also possible to use a different liquid which does not damage the battery films or electrode films. This may be an aqueous liquid which is removed from the films or from the electrode material or anode/cathode material again in a subsequent dehydration process. In an alternative embodiment of the invention, the energy cell could also be a fuel cell, wherein the films then form electrodes of the fuel cell.

In a preferred embodiment of the invention, the method therefore comprises the following step of: drying the film after cutting, in order to remove residual liquid. This step comprises for example the placing of the films, preferably as a stack, in a treatment environment for removing the liquid by heat and/or by low ambient pressure; that is to say a negative pressure or partial vacuum. The treatment environment may preferably be in a chamber or in a container.

A further advantage of the present invention in production terms, in particular in the case of a prismatic structure of the films, is that it can produce a very regular and straight cut edge over an entire stack of films, including separating layers or separators. If this is not the case, contact between two battery films can occur during packaging and thus likewise a short circuit and failure of the batteries or rechargeable batteries can occur.

In a preferred embodiment of the invention, during cutting, the films at the processing location can be moved in relation to the laser beam and/or the laser beam can be moved in relation to the films at the processing location. In this regard, the processing location can be mounted so as to be movable in relation to the cutting head in the apparatus according to the invention. Alternatively or in addition, the cutting head can be mounted so as to be movable in relation to the processing location. The movable processing location and/or the movable cutting head is controlled preferably by a control means, for example having one or more stepping motors. Preferably, the film stack is or the films are fixed or fastened to the processing location, in order to avoid possible undesired movements. In this way, the cutting of the edges of the film stack can be carried out and controlled very precisely.

The above-described configurations and developments of the invention can, where practical, be combined with one another as desired. Further possible configurations and implementations of the invention also comprise combinations, not explicitly mentioned, of features of the invention that have been described above or are described in the following text with regard to the exemplary embodiments. In particular, a person skilled in the art will add individual aspects as improvements or additions to the respective basic form of the present invention.

BRIEF DESCRIPTION OF THE DRAWINGS

The present invention will be explained in more detail in the following text with reference to the exemplary embodiments indicated in the schematic figures of the drawings, in which:

FIG. 1 shows a schematic illustration of a method and an apparatus according to one exemplary embodiment of the invention.

The accompanying drawing is intended to impart further understanding of the embodiments of the invention. It illustrates one embodiment and serves, in conjunction with the description, to explain principles and concepts of the invention. Other embodiments and many of the mentioned advantages will become apparent with regard to the drawing. The elements of the drawing are not necessarily shown to scale with respect to one another.

DETAILED DESCRIPTION

With reference to FIG. 1, a method and an apparatus for producing an energy storage cell or battery in accordance with a preferred exemplary embodiment of the invention will now be explained. The apparatus 1 shown in FIG. 1 has a cutting head 2, which is arranged above a processing location 3. The processing location 3 beneath the cutting head 2 is designed for arranging a plurality of films 4, specifically the electrode films 4 of the energy storage cell or battery. The films 4 are arranged in the form of thin sheets or plates on top of one another in a prismatic stack 5 at the processing location 3, for example in a rectangular stack or, as shown in FIG. 1, a cylindrical stack 5. Arranged between the individual films 4 in the stack 5 is a separating layer 6, such that adjacent films 4 are kept separate or at a distance from one another. The processing location 3 has a support 7, which is designed for fixing and keeping the stacked electrode films 4 in the prismatic shape beneath the cutting head 2.

The films 4 and the separating layers 6 consist of different materials, which are dependent on the use of the battery. As anode films, they consist for example of a laminate or core composite of a copper film having a thickness in the range of 10-20 µm between two graphite layers each having a thickness of between 30 and 40 µm, such that the thickness of the anode film as a whole is in the range of 70-100 µm. As cathode films, they consist for example of a laminate or core composite of an aluminum film having a thickness in the range of 20-30 µm between two metal oxide layers each having a thickness in the range of 70-80 µm, such that the thickness of the cathode film as a whole is in the range of 160-190 µm.

The cutting head 2 has a laser source 8, which can be formed for example as a pulsed laser or CW laser. Furthermore, the cutting head 2 comprises an arrangement 9 having at least one lens 10 for guiding a laser beam 11 generated by the laser source 8 into and/or through a nozzle device 12 of the cutting head. The nozzle device 12 is connected via an inlet 13 to a liquid source, in order to create a liquid jet 14 directed onto the films 4 at the processing location 3. In other words, the cutting head 2 comprises a nozzle device 12 for creating a liquid jet 14 directed onto the film stack 5, which is fastened to the support 7. This device 12 comprises a housing 15 having a chamber 16 and a nozzle 17, which serves as an outlet out of the chamber 16 and for creating the liquid jet 14.

The nozzle device 12 is arranged in the path of the laser beam 11 and has a window 18 in a wall of the nozzle housing 15, through which the laser beam 11 can be projected, specifically such that the laser beam 11 is guided through the nozzle 17 into the liquid jet 14. As shown in the detail "A" of FIG. 1, the liquid jet 14 acts as a waveguide for the laser beam 11, which is guided by internal reflection along the liquid jet 14 onto the stack 5 of films 4. The cutting head 2 is movable in at least three dimensions (e.g. along the spatial axes x, y, z) with regard to the processing location 3, and in particular with regard to the support 7. Furthermore, parts of the cutting head 2, in particular the laser source 8, the lens 10 and/or the nozzle device 12, can also be mounted so as to be movable in relation to one another (e.g. along the spatial axes x, y, z).

In the production of a battery or lithium-ion battery according to the present invention, the stacked electrode films 4 are arranged at the processing location 3 in the apparatus 1. A liquid jet 14 is created through the nozzle 17 of the nozzle device 12 and the workpiece, specifically the stack 5 of films 4, is moved toward the liquid jet 14, e.g. by means of a controlled movement of the support 7 and/or by means of a controlled movement of the cutting head 2. As the film stack 5 approaches contact with the liquid jet 14, the laser source 8 is switched on, in order to generate the laser beam 11. The laser beam 11 is guided by means of the lens 10 into the liquid jet 14 through the window 18 in the nozzle housing 15 and along the liquid jet 14 in the direction of the films 4. When the stack 5 comes into contact with the laser beam 11 in the liquid jet 14, the laser beam 11 immediately starts to cut the films 4. The movement of the support 7 and of the cutting head 2 is continued during cutting, in order to cut edges 19 of the desired shape in the stack 5 of films 4. The interaction of the liquid jet 14 and laser beam 11 creates a particularly clean and straighter cut through the films 4, such that the cut edges 19 of the electrode films 4 can be manufactured largely without melt drops, chips or splinters or flaked coatings.

Once the cutting of the films with the combined laser beam 11 and liquid jet 14 is complete, this beam and jet are switched off and the support 7 having the stack 5 of cut films 4 can be converted into a closed container, in which the films 4 are subjected to a drying process or step. The support or container 7 can be exposed for example to heated air and/or negative pressure, in order to remove any residual liquid from the films. The electrodes of the battery are then completed from the cut films 4.

What is claimed is:

1. A method for producing an energy cell, the method comprising:
   arranging a plurality of films of an energy cell one above or on top of another in a stack at a processing location; and
   cutting the plurality of films in one operation, wherein the cutting of the films is carried out by a laser beam, and wherein the laser beam is guided in a liquid,
   wherein the energy cell is an energy storage cell or a battery, and the films are battery films, wherein the liquid comprises an electrolyte of the battery.

2. The method according to claim 1, wherein individual films are kept separate or isolated from one another in the stack by respective separators.

3. The method according to claim 1, wherein the stack of films has a substantially prismatic shape.

4. The method according to claim 1, wherein the liquid is directed toward the films in a jet and cools a cut edge of the films during cutting.

5. The method according claim 1, wherein the laser beam is guided onto the films at a processing location in a liquid jet.

6. The method according to claim 1, wherein the laser beam is guided into the liquid jet through a nozzle.

7. The method according to claim 1, further including:
   drying the films after cutting, wherein the stack is placed in a treatment environment for removing the liquid by heat and/or by low ambient pressure.

8. The method according to claim 1, wherein the energy cell is a lithium-ion battery, and the films are battery films.

9. The method according to claim 7,
   wherein the treatment environment is configured as a chamber or container.

* * * * *